United States Patent [19]

Sliger

[11] Patent Number: 4,457,761
[45] Date of Patent: Jul. 3, 1984

[54] METHOD AND APPARATUS FOR MARKING CONTACT LENSES

[75] Inventor: Richard Sliger, Tuscon, Ariz.

[73] Assignee: Precision Cosmet Co., Inc., Minnetonka, Minn.

[21] Appl. No.: 466,786

[22] Filed: Feb. 16, 1983

[51] Int. Cl.³ .................. B29D 11/00; D06P 3/00; G02C 7/04

[52] U.S. Cl. .................................. 8/507; 118/211; 351/162; 427/164

[58] Field of Search ............... 351/160 R, 160 H, 162; 350/320; 118/211, 212; 8/507; 427/164

[56] References Cited

FOREIGN PATENT DOCUMENTS 1547525  6/1979  United Kingdom .

Primary Examiner—Michael R. Lusignan

[57] ABSTRACT

The method and apparatus for marking of soft contact lenses with identification indicia is disclosed. A film cartridge is provided for supporting a non-gel film having lens marking indicia gel or dye disposed thereon. The cartridge has an opening therein to access the film and a backing pad is positioned proximate the film opposite the opening to disperse marking contact force. A lens supporting pedestal having a curvilinear head is provided for supporting the lens in a marking position. A pair of spring biased latches are provided for engaging either end of the cartridge which includes recesses to engage the latching members. A guide is provided for aligning the cartridge, and the film supported therein, with the curvilinear marking head. The cartridge and pedestal are sized to cause a predetermined force to be applied to the film against the backing pad through the lens to be marked. To mark a lens, it is cleaned, rinsed and dried, and positioned on the curvilinear head. The film cartridge, with the gel indicia bearing film aligned therein, is then inserted over the guide and latched into place for one minute, whereby the gel or dye indicia is transferred from the film to the lens. After the cartridge is removed, a developer is applied to the lens in the area to mark for a brief time to make the indicia permanent, and the lens is rinsed under a stream of saline solution and thermally disinfected.

13 Claims, 4 Drawing Figures

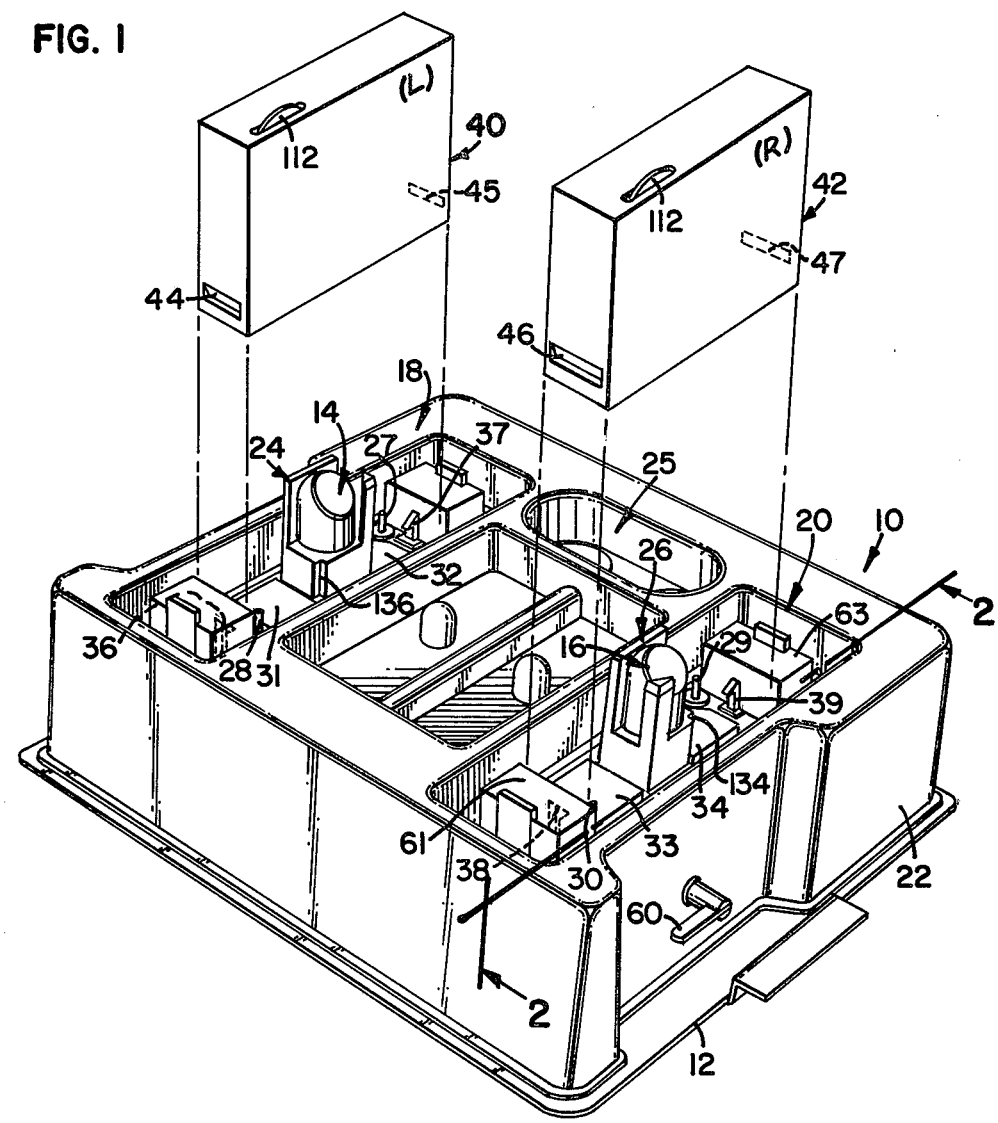

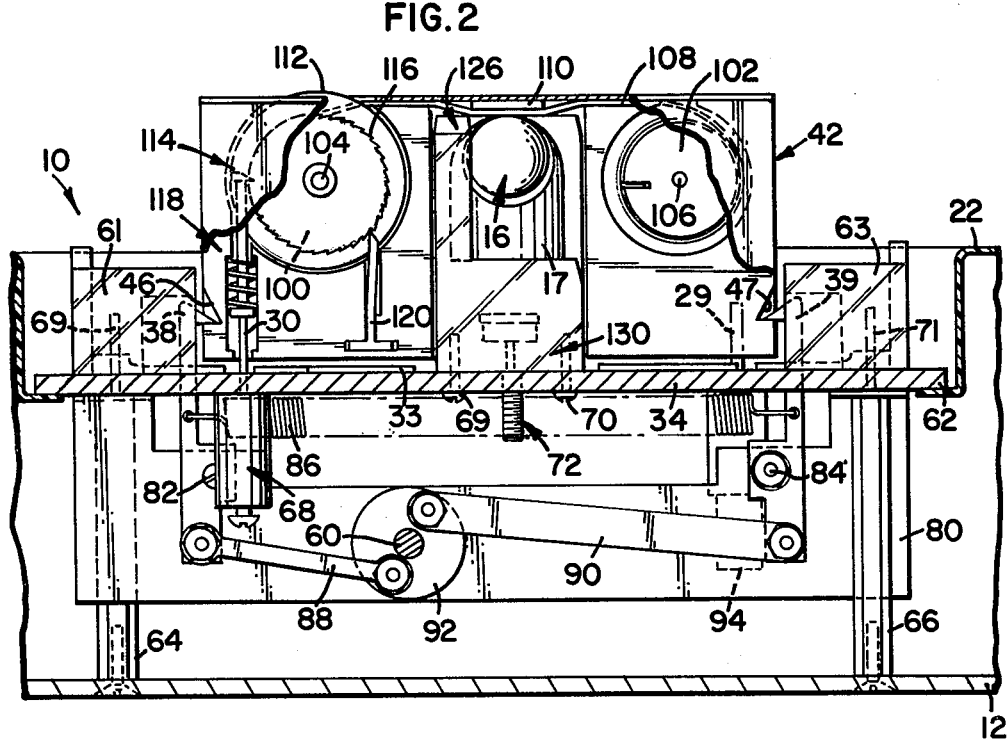
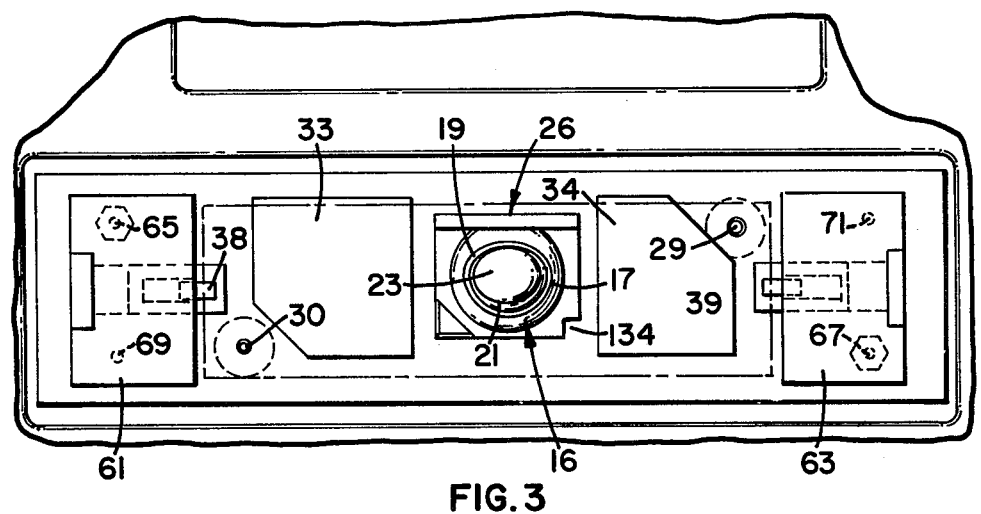

METHOD AND APPARATUS FOR MARKING CONTACT LENSES

BACKGROUND OF THE INVENTION

The present invention pertains to the field of ophthalmology, and more particularly to a method and apparatus for marking contact lenses.

Contact lenses for the correction of vision are now in widespread use, providing a practical and sometimes advantageous alternative to glasses for most individuals requiring correction of imperfect vision. The first commercially successful contact lenses were the so called hard contacts, so named by virtue of their rigid construction. However, due in part to their rigidity, which made optimum fitting difficult to achieve, and in part to eye lubrication difficulties resulting from the relative impermability of the typical hard lens materials, acceptance of the hard contact lens was and still is limited.

In response to the drawbacks of hard contact lenses, flexible and permeable contact lenses were developed, and these types of contact lenses have come to be known as hydrophilic or soft contacts. The soft contact lens provides for a substantially better fit to the contours of the eye and additionally permits more natural eye lubrication by virtue of its permeable or hydrophilic properties. However, distinguishing between the left and right lens of a soft contact lens pair has proved to be considerably more difficult than in the case of hard contact lenses. Additionally, unlike the hard lens, the soft lens is subject to inversion and this too, like the above noted problem, is difficult to distinguish or identify until the lens is in place on the eye. In view of the relative difficulty of inserting and removing a lens, it is desirable that each lens is marked, usually near its edge, whereby identification of the right and left lens, as well as the proper orientation, i.e. inverted vs. noninverted, may be easily accomplished by the wearer before insertion.

Accordingly, lens marking methods and apparatus have been developed in the prior art. For example, British Patent No. 1,547,525, published June 20, 1979, discloses a chemical process and an apparatus for accomplishing the marking of lenses, for example, with the respective indicia "R" and "L". According to the apparatus disclosed, the lens to be marked is supported on a convex surface and a striker arm having a minute liquid absorptive relief area forming a marking indicia is provided. The absorptive relief area is soaked in an aqueous azo dye solution and then manually pressed against the contact in the appropriate location to transfer the solution to the lens in the manner of a printing process. The lens marking solution in the form of a marking indicia is thereby transferred to the lens and is thereafter made indelible by further chemical process.

While the above noted apparatus and its corresponding method can accomplish marking of contact lenses, it is relatively cumbersome, both with respect to the number of steps involved and with respect to the operation of mechanical apparatus. Consequently, the technique must be accomplished by relatively skilled technicians and is none the less vulnerable to human error. For example, the technician must maintain the relief area in an adequately soaked condition, apply an adquate but not damaging pressing force, and be sure to select the proper striking surface from several alternatives. Therefore, there is a need for a simpler and more foolproof lens marking apparatus and method, and such is provided by the present invention.

SUMMARY OF THE INVENTION

The present invention provides a method and apparatus for marking a contact lens with identification indicia. According to the apparatus, a film cartridge is provided for supporting a non-gel film having lens marking indicia gel or dye disposed on a first side thereof, the cartridge having an opening therein to access the first side of the film. A backing pad or force dispersion means is positioned opposite the opening with the film being supported in close proximity to the backing pad. For retaining a lens in a marking position means having a curvilinear surface is provided. Engaging means are provided for holding the lens retaining means and the film cartridge together in a predetermined alignment and for pressing the lens to be marked against the gel indicia bearing film and pad backing with a predetermined force, the pad dispersing the pressing force over a limited area of the lens, whereby indicia gel is transferred to the lens.

According to the method of the present invention, the lens is cleaned, rinsed and dried and positioned on the lens retaining means. Next, with the film carried gel indicia properly aligned within the cartridge, the cartridge and the lens retaining means are engaged for a predetermined time. As a result, gel indicia is transferred from the film to the lens. To make the indicia permanent, a developer is applied to the lens in the area of the mark for a brief time. After development, the lens is rinsed under a stream of saline solution and thermally disinfected.

According to one aspect of the invention, the cartridge includes a pay-out spool and a take-up spool with an indicia bearing film strip travelling therebetween, and means responsive to disengagement of the cartridge from the lens retaining means for incrementally advancing the film strip from the pay-out spool to the take-up spool to prevent a second use of the same lens marking indicia gel. Also, the cartridge is provided with a thumbwheel connected to the take-up spool for manually advancing the film.

According to another aspect of the invention, the lens retaining means includes a base plate with a platform supported thereon, and a lens supporting pedestal having a curvilinear top mounted on the platform.

According to still another aspect of the invention the engaging means includes guide means for guiding and aligning the cartridge over the pedestal, register means for assuring proper orientation of the cartridge, and latching means for holding the cartridge in a fixed relationship with the frame during the indicia gel transfer process. Other aspects of the present invention are evidenced in the following specification and claims.

BRIEF DESCRIPTION OF THE DRAWING

FIG. 1 is a perspective view of the lens marking apparatus of the present invention;

FIG. 2 is a cross-sectional side elevation taken along lines 2—2 of FIG. 1 with a film cartridge in a latched position;

FIG. 3 is a plan view of one side of the marking apparatus of FIG. 1 with the cartridge removed; and FIG. 4 is a plan view taken from the open side of a film cartridge.

DETAILED DESCRIPTION OF THE INVENTION

The following description will be given referring to FIGS. 1-4 throughout which like elements bear like reference numerals. Referring to FIG. 1, a perspective view of the lens marking apparatus of the present invention is illustrated. A base assembly 10 is provided for supporting a pair of contact lenses in marking positions and for receiving and engaging a pair of left and right marking film cartridges, 40 and 42 respectively. Base assembly 10, which may also be seen in FIG. 2, includes a base plate 12, left and right lens retaining apparatus 14 and 16 respectively, left and right cartridge receiving apparatus 18 and 20 respectively, and a housing 22, which may be provided with a cover if desired.

Each cartridge receiving apparatus 18 and 20 include the respective guides 24 and 26, and upwardly extending pins 28 and 30. Each of cartridge receiving apparatus 18 and 20 further include resilient pads 31-34 and a pair of latching assemblies principally contained within housing 22 and having upwardly extending latching members 36-39 for engaging the respective recessed areas 44-47 on the ends of cartridges 40 and 42. Each latching member 36-39 is spring biased toward their respective lens retaining apparatus 14 and 16 and may be released by depressing a latch releasing member associated therewith, of which only latch release 60, for controlling members 38 and 39, is shown in the drawing. However, it will be understood that the same is provided for control of latch members 36 and 37. Cartridge receiving apparatus 18 and 20 also include the respective depressable plunger pins 27 and 29, which provide an upward biased spring force for aiding in the release of a cartridge from the latching members.

In FIG. 2 a cross-sectional view of the right half of the lens marking apparatus of the present invention is illustrated, with the right cartridge 42 in a latched or marking position. Although not explicitly shown or described herein, it will be understood that the same structure is employed for the left half of the lens marking apparatus of the present invention, except that guides 24 and 26 are constructed in a mutually opposite manner whereby registers provided in the left and right cartridges 40 and 42 may be employed to assure the cartridges are used only with the respective left and right receiving apparatus 18 and 20. As shown in FIG. 2, lens retaining apparatus 16, guide 26 and pads 33-34 are supported on a platform 62. The platform 62 is suspended above base plate 12 by support members 64 and 66. Upwardly extending pin 30 and guide 26 are secured to platform 62 with assembly 68, and machine screws 69 and 70, respectively. Means 72 are provided for positioning and holding lens retaining apparatus 16 in a predetermined elevation with respect to platform 62. Protective latch covers 61 and 63 are provided to keep contaminants out of the inside of housing 22. Covers 61 and 63 are mounted on platform 62 with any suitable means, for example the respective nut and bolt assemblies 65 and 67 and register pins 69 and 71, which extend upwardly from support members 64 and 66 respectively.

Latching members 38 and 39 and the apparatus associated therewith is supported by a member 80, which like platform 62 is supported above the base plate 12 by members 64 and 66. Latching members 38 and 39 are pivoted at the respective hinges 82 and 84 and a spring 86 is provided to bias the latching members toward each other above their respective axes. The latching apparatus further includes armatures 88 and 90, which are pivotably connected to the lower ends of the respective members 38 and 39 and to a center wheel 92. A latch release knob 60 extends outwardly from the axle or center of wheel 92 and when rotated in a counterclockwise position latch members 38 and 39 pivot away from their spring bias position, whereby a latched cartridge may be released. Although not explicitly illustrated for the sake of clarity in the drawing, it will be understood that any suitable means 94 is mounted on the underside of platform 62 to provide an upward spring bias on the depressable plunger 29.

Lens retaining apparatus 16 comprises a pedestal 17 with a curvilinear top 21 slightly recessed from the pedestal 17, the edge or lip of the recess bearing reference numeral 19. As may be better seen with respect to FIG. 3, curvilinear recessed top 21 is positioned off the center axis of the pedestal 17 so that the edge of a lens 23 retained thereon is near the apex of pedestal 17. Lip 19 provides an abutment against which the edge of the lens 23 may be positioned, thereby assuring proper positioning of the lens 23 during marking. The surface of recessed top 21 is of a suitably smooth material, a polished plastic in the present embodiment, to avoid damage to the lens 23. It will be understood that lens retaining apparatus 14 is similarly constructed, although not explicitly shown in the drawings.

The film supporting cartridge 42 includes a film take-up spool 100 and a film pay-out spool 102 mounted for rotational movement at the respective axles 104 and 106. A film strip 108 extends between spools 104 and 106 and passes underneath a resilient pad 110, felt in the present embodiment, which provides means for dispersing or deflecting force applied to the film through a lens to be marked, so that the force is distributed over a predetermined limited area of the lens, or about a 1.5 mm area as is in the case of the present embodiment. The pad 110 may be attached to the cartridge with adhesive, and preferably the surface attached to should be hard and flat. Spool 100 is provided with a thumbwheel 112 for manual advancement of the film from spool 102 to spool 100 and a pawl and ratchet assembly 114 for automatically advancing the film upon disengagement of the cartridge from the latched position. Assembly 114 includes a ratchet 116, a spring biased toothed plunger 118 and a pawl 120. Toothed plunger 118 is provided for engaging ratchet 116 and rotating it in a counterclockwise direction, thereby advancing the film. The pawl 120 provided for preventing clockwise rotation of spool 100 and thereby prevent backwinding of the indicia bearing film strip 108. Means for cocking plunger 118 is provided by the aforementioned pin 30, which extends upwardly into the cartridge and against plunger 118 when the cartridge is pressed into the latched or marking position. As may be seen with respect to FIG. 4, the opening 130 of cartridge 42 includes a register key 132 in the form of a rectangular protrusion, which fits or occupies the corresponding rectangular notch 134 in guide 26. Guide 24 has an oppositely positioned notch 136 and cartridge 40 has an oppositely positioned key (not shown), whereby cartridge 42 is precluded from fitting over guide 24 and cartridge 40 is precluded from fitting over guide 26. Accordingly, cartridges 40 and 42 may be fit only over the respective guides 24 and 26.

As partially illustrated in FIG. 4, gel or dye indicia bearing film 108 is a continuous non-gel strip bearing gel indicia markings, "R" in this instance, spaced apart approximately one width of pad 110. Preferably, a pair of mutually exclusive fitting cartridges are provided, one with film bearing the indicia "R" and one with film bearing the indicia "L", whereby pairs of lenses may be marked simultaneously. In the present embodiment, the letter indicia is about 0.7 mm high, about 1.2 mm long, with a line width of about 0.15 mm. Numerals 120 are provided to indicate the number of markings remaining on the strip. Each indicia is accompanied by a hash mark 122 which when aligned with the cartridge borne hash mark 124 insures proper alignment of the marking indicia for marking the contact lens when the cartridge 42 is engaged with the lens retaining apparatus. Although ratchet and pawl assembly 114 provides means for advancing the film after each marking operation, such advancement is not complete, and is only intended to prevent a second use of the same marking gel indicia. Therefore, advancement of the film and alignment of the indicia hash mark 122 with the cartridge hash mark 124 is accomplished via thumbwheel 112 in a manual fashion. Inadvertent backward rotation of the film is prevented by pawl 120. If desired, it is contemplated that the same ratchet and pawl concept may be utilized to provide complete advancement of the film and thereby eliminate the manual advancement.

The chemical aspects of the present invention, namely the formation of the indicia gel or dye and the development of the dye on the contact lens being marked is known and disclosed in the prior art, for example in the aforementioned British Patent Specification No. 1,547,525, published June 20, 1979. Specifically, the present invention utilizes the "first relief method" of said British specification, wherein an aqueous solution of a diazonium salt is dispersed and absorbed into an aqueous gel relief and deposited on an imaging substrate, for example the non-gel film strip of the present invention. As set forth in said British specification, a solution bearing gel relief is contacted with the lens for sufficient time for the diazonium salt to permeate and disperse into the lens to form a latent image of the relief portion or indicia, development of the latent image accomplished by contacting the imaged area of the lens with an aqueous solution of an azo coupler.

The present invention may be used to mark a hydrophilic lens, i.e. soft contact, as follows. If the lens has been worn, it must be cleaned and rinsed thoroughly using the lens manufacturer's recommended cleaning procedure. The present invention is not recommended for marking soft lenses that have become contaminated with the calciferous or proteinaceous deposits. After gently blotting excess liquid from both sides of the lens using a soft disposable tissue, the lens is placed in the recess area 21 of the appropriate lens holder, i.e. right or left. The lens should be gently positioned to the top edge or lip 19, with the front surface up.

Selecting the proper film cartridge, for example cartridge 42, the thumbwheel 112 is used to advance the marking film strip 108 until one of its alignment hash marks 122 is positioned exactly over or aligned with the alignment hash mark 124 on the cartridge. Due to pawl 120 the strip will move in one direction only and if the marking strip is advanced too far, it must be advanced to the next gel indicia. The cartridge is then inserted over the guide and latched into position by firmly pressing on top of each end of the cartridge simultaneously, making sure that the latch is engaged both ends of the cartridge. As for example illustrated in FIG. 2, the cartridge 42 and lens retaining apparatus 16 are sized so that the indicia gel bearing film strip 108 is pressed via pad 110 against the lens to be marked with a predetermined force. Resilient pads 33 and 34 are provided to assure that an excessive force is not applied to the lens as the cartridge 42 is being latched into place. The cartridge should be allowed to remain in the latched or marking position for one minute. When this time has elapsed, the cartridge is released by pressing latch release lever 60. Due to the spring forces supplied by plunger assemblies 118 and 29, a small ejecting force is provided at opposite corners of the cartridge 42 and it releases easily. After release, the cartridge is removed and may be placed in the appropriate storage area as provided in the center of housing 22.

With the lens still on the recessed area 21, one drop of developer solution, for example the above mentioned azo coupler, is applied to the transferred indicia gel or dye. The developer solution may be kept in small vials, and the vials may be stored in cylindrical cavities provided in housing 22, for example at 25. The developer should be allowed to remain on the lens for at least two minutes and then the lens removed from the holder and rinsed for one minute under a stream of saline solution recommended by the lens manufacturer for use with the lens. To complete the marking process, the lens should then be thermally disinfected in an FDA approved thermal disinfection unit. When the lens cools, the marking procedure is complete. Although the marking process has been described with respect to only one lens, it shall be understood that it preferable to mark both lenses of a pair simultaneously, thereby improving labor efficiency.

As will be seen from the foregoing, the present invention provides means for marking the right and left lenses of a contact lens pair simultaneously, and provides apparatus which assures that an optimum indicia gel or dye is provided for the marking of each lens and that the proper marking force, i.e. one that accomplishes the transfer of the indicia to the lens without damage thereto, is provided. Also, the present invention provides mutually exclusive marking cartridges and lens retaining means to reduce the likelihood that lenses will be erroneously marked with the wrong indicia. However, it will be understood that the continuous film strip concept of the marking cartridges is not essential to the present invention, nor the mutually exclusive aspects of the cartridges and receiving apparatus. For example, film slides bearing gel indicia could be utilized instead of a film strip, or a single receiving apparatus, as opposed to two, could be means employed with one or more cartridges without mutually exclusive register means.

It will be understood that the above-described embodiment is merely exemplary of the present invention and that the full scope of the present invention shall be determined from the claims hereafter appended.

What is claimed is:

1. A contact lens marking apparatus comprising: cartridge means for supporting a film having lens marking dye disposed on a first side thereof, said cartridge having an opening therein to access said first side of said film and including force dispersion means positioned opposite said opening, said film being supported between said dispersion means and said opening with said first side facing said opening;

means for retaining a lens in a marking position; and means for engaging said lens retaining means and said cartridge means together so that the retained lens presses said film against said force dispersion means with a known force to cause a limited area of said lens to contact said lens marking dye.

2. The apparatus of claim 1 wherein said cartridge means further includes a pay-out spool and a take-up spool and wherein said film travels between said spools across said opening.

3. The apparatus of claim 2 wherein said cartridge includes means responsive to disengagement from said lens retaining means to incrementally advance said film from said pay-out spool to said take-up spool to prevent a second use of the same lens marking dye and wherein said cartridge means further includes means for preventing said take-up spool from paying out said film.

4. The apparatus of claim 3 wherein said cartridge includes a thumbwheel connected to said take-up spool for manually advancing said film.

5. The apparatus of claim 1 wherein said lens retaining means comprises a frame having a lens supporting pedestal mounted thereto, said pedestal having a curvilinear top and means positioned about said curvilinear top for retaining said lens in a predetermined relationship therewith.

6. The apparatus of claim 5 wherein said engaging means comprises register means for guiding and aligning said cartridge opening over said pedestal and latching means for holding said cartridge in a fixed relationship with said frame during the dye transfer process.

7. Contact lens marking apparatus comprising: a cartridge for carrying a film having lens marking dye indicia disposed on a first side thereof, said cartridge having a film access opening and including force dispersion means mounted opposite said opening, said film being carried with said first side directed toward said opening and said second side proximate said force dispersion means;
   a base assembly for holding a lens in marking contact with said film, said assembly comprising:
   a platform;
   a pedestal mounted on said platform and having a curvilinear top for bearing a lens to be marked;
   register means for guiding and aligning said cartridge into engagement with said platform with said pedestal within said film access opening;
   cartridge detaining means mounted to said platform for holding said cartridge in engagement with said platform, said pedestal sized to press said lens against said film and said force dispersion means to cause a limited area of said lens to contact said film with a known force.

8. The apparatus of claim 7 wherein said cartridge further includes means for carrying a strip of said film and for advancing said film across said opening, said strip of film having a plurality of marking dye indicia disposed along its length.

9. The apparatus of claim 8 wherein said means for carrying a strip of said film comprises a take-up spool and a pay-out spool and wherein said film strip travels between said spools across said opening.

10. The apparatus of claim 9 wherein said cartridge means includes a film advancing means responsive to disengagement from said base assembly to incrementally advance said film from said pay-out spool to said take-up spool to prevent the use of the same lens marking indicia twice.

11. The apparatus of claim 10 wherein said film advancing means comprises a ratchet mounted to said cartridge and connected to rotate said take-up spool, a spring biased toothed plunger mounted to said cartridge and positioned for engaging the tooth or said ratchet when depressed and for turning said ratchet when released, and a pin mounted to said base assembly for depressing said plunger when said cartridge is engaged with said base assembly.

12. A contact lens marking apparatus comprising: first and second cartridge means for supporting first and second films having lens marking dye disposed on the first sides thereof, each of said cartridges having an opening therein to access said first sides of said films and including force dispersion means positioned opposite said openings, said films being supported between said dispersion means and said openings with said first sides facing said openings;
   first and second means for retaining a lens in a marking position; and
   first and second means for engaging said lens retaining means and said cartridge means together so that the retained lenses press said films against said force dispersion means with a known force to cause a limited area of said lenses to contact said lens marking dye, said first and second means for engaging including unique register means to provide exclusive engagement with the respective first and second cartridge means.

13. A method of marking contact lenses comprising the steps of:
   (a) providing a marking indicia dye disposed on a non-gel film;
   (b) supporting said film in a film cartridge and providing force dispersion means behind said film;
   (c) providing a lens supporting pedestal and positioning a lens to be marked on said pedestal;
   (d) guiding said cartridge over said pedestal;
   (e) engaging said cartridge and said pedestal into a lens marking position to assure proper alignment and to assure proper marking force is supplied between said lens to be marked and said film;
   (f) releasing and removing said cartridge from engagement with said pedestal after a predetermined time of engagement;
   (g) developing the image transferred to said lens from said indicia dye on said film; and
   (h) removing said lens from said pedestal and rinsing said lens in an appropriate saline solution.

* * * * *

UNITED STATES PATENT AND TRADEMARK OFFICE
CERTIFICATE OF CORRECTION

PATENT NO.  : 4,457,761

DATED       : July 3, 1984

INVENTOR(S) : Richard Sliger

It is certified that error appears in the above-identified patent and that said Letters Patent is hereby corrected as shown below:

On the face of the patent after "[56] References Cited", the following should be added:

-- U.S. PATENT DOCUMENTS

| | | | |
|---|---|---|---|
| 2,065,690 | 12/1936 | Gould et al. | 101/193 |
| 2,178,516 | 10/1939 | Brenner | 101/41 |
| 2,557,295 | 06/1951 | Kidwell | 101/41 |
| 2,777,824 | 01/1957 | Leeds | 260/2.5 |
| 3,322,598 | 05/1967 | Marks et al. | 156/382 |
| 3,476,499 | 11/1969 | Wichterle | 8/4 |
| 3,679,504 | 07/1972 | Wichterle | 156/62 |
| 3,977,510 | 08/1976 | Hurley | 197/151 |
| 3,978,965 | 09/1976 | Klem | 197/151 |
| 4,005,654 | 02/1977 | Gundlach | 101/426 |
| 4,018,162 | 04/1977 | Sharkey et al. | 101/473 |
| 4,157,892 | 06/1979 | Tanaka et al. | 8/14 |
| 4,202,637 | 05/1980 | Tummolo | 400/118 |
| 4,242,162 | 12/1980 | Ronning et al. | 156/212 |
| 4,243,333 | 01/1981 | Bradshaw et al. | 400/158 |
| 4,257,329 | 03/1981 | Panken et al. | 101/473 |
| 4,369,082 | 01/1983 | Kerwin | 156/238 -- |

Signed and Sealed this

Eleventh Day of December 1984

[SEAL]

Attest:

GERALD J. MOSSINGHOFF

*Attesting Officer*    *Commissioner of Patents and Trademarks*